No. 615,134. Patented Nov. 29, 1898.
G. BORRETT & J. R. CRISPIN.
MOWER ATTACHMENT.
(Application filed Mar. 31, 1898.)

(No Model.)

Witnesses
N. Walker
H. L. Amer.

Inventors
George Borrett and
Joseph R. Crispin
by O. L. Shockbridge.
their Attorney.

UNITED STATES PATENT OFFICE.

GEORGE BORRETT AND JOSEPH R. CRISPIN, OF MAGNOLIA, MASSACHUSETTS.

MOWER ATTACHMENT.

SPECIFICATION forming part of Letters Patent No. 615,134, dated November 29, 1898.

Application filed March 31, 1898. Serial No. 676,022. (No model.)

*To all whom it may concern:*

Be it known that we, GEORGE BORRETT and JOSEPH R. CRISPIN, citizens of the United States, residing at Magnolia, in the county of Essex and State of Massachusetts, have invented certain new and useful Improvements in Mower Attachments; and we do hereby declare the following to be a full, clear, and exact description of the invention, such as will enable others skilled in the art to which it appertains to make and use the same.

This invention relates to lawn-mower attachments; and it consists, essentially, of a trailing hood or receptacle removably attached to the rear part of an ordinary mower and comprising a roller at the rear lower portion thereof and depending pins on the front of the opposite sides, which are removably fitted in eyes carried by a part of the mower-frame immediately above the roller of the latter, the said ends carrying the pins being cut away at their lower front edges to permit a snug engagement of the said pins with the eyes.

The invention further consists of the details of construction and arrangement of the several parts, which will be more fully hereinafter described and claimed.

The object of the invention is to simplify the construction and arrangement of removable hoods for lawn-mowers, so that they may be easily and readily attached and detached, and also to adapt such devices for use with any form of mower and effectually gather and hold the cut grass passing rearwardly from the mower.

Figure 1:
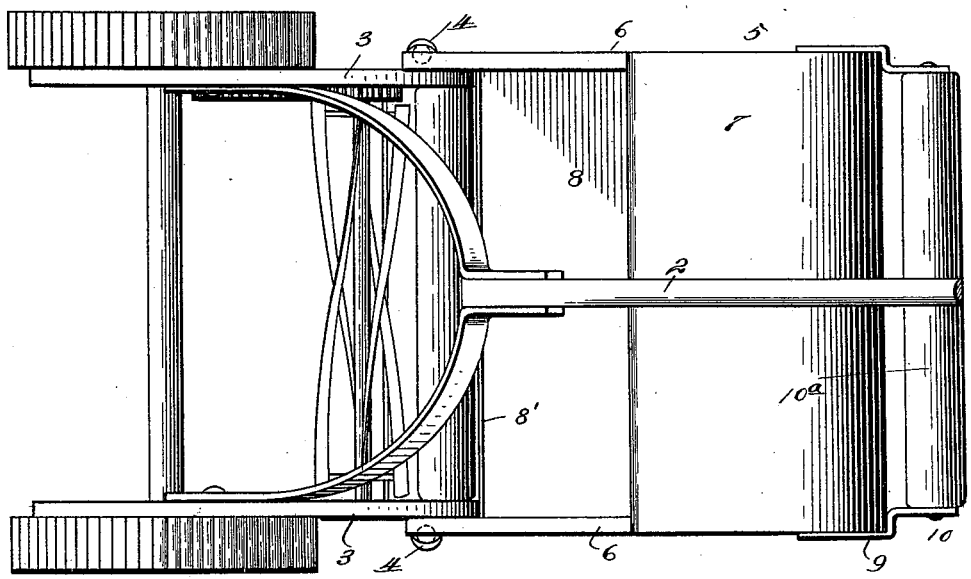
Figure 2:
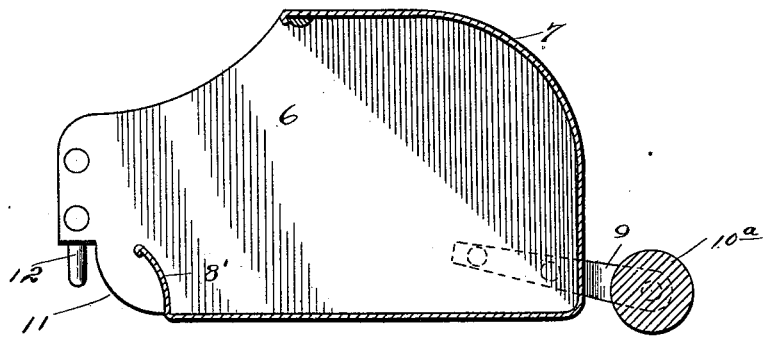
Figure 3:
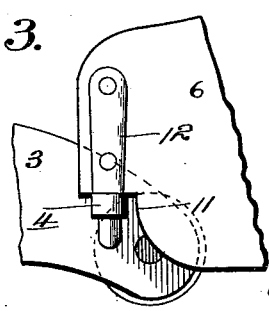

In the accompanying drawings, Figure 1 is a plan view of a lawn-mower, showing the improved hood or receptacle applied thereto. Fig. 2 is a transverse sectional view through the hood or receptacle. Fig. 3 is a detail elevation, on an enlarged scale, of a part of the mower-frame and one end of the hood or receptacle, clearly showing the cut-away part of the said end where it engages the eye on the mower-frame.

Referring to the drawings, wherein similar numerals of reference are employed to indicate corresponding parts in the several views, the numeral 1 designates a lawn-mower of any preferred form of construction and including an operating-handle 2 and rearwardly-extending arms 3, in which the usual roller is journaled in rear of the cutter. The said arms 3 each have extending outwardly therefrom and positioned in a horizontal plane an eye 4 at a suitable elevation above the lower termination of each arm. The hood or receptacle 5 in this instance comprises opposite ends 6, having a surrounding covering 7, with a front opening 8 directly in rear of the arms 3 when said hood is applied to the mower, and consequently in rear of the cutter or rotating knives. The said ends 6 at their upper front portions are also cut away to remove obstructions at this point and permit the proper elevation of the operating-handle 2, and the lower front edge of the covering 7 is bent upwardly in the form of a lip, as at 8', and in a slight forward plane to operatively receive the roller of the lawn-mower and also institute a close fitting with the adjacent curved portions of the arms 3. By this arrangement the formation of an opening between the said lip and roller of the lawn-mower is prevented and a thorough gathering of the cut grass will ensue. To the rear lower portions of the ends 6 bracket-arms 9 are rigidly connected and extend rearwardly at a slight downward angle of inclination, being formed with intermediate bends 10 to locate the rear free ends of the said arms slightly inside of the outer opposite terminations of the hood, and in the said free ends of the arms a rear roller $10^a$ is journaled and holds the hood or roller at a proper elevation relatively to the fastening means at the front thereof and also provides for an easy movement of the said roller over the ground or grass being cut. The front parts of the opposite ends 6 are extended somewhat in advance of the lip 8' and are cut away at their lower front corners, as at 11, a distance slightly greater than the width of the eyes 4 on the arms 3. On the outer portions of the front parts of the ends 6 pins 12 are secured and depend over the cut-away corners of the said ends, the said pins having elongated shanks for securing purposes and rounded at their lower ends to removably fit the eyes 4. The said pins 12 are so positioned that when they are inserted in the eyes 4 the latter will be located in the lower cut-away corners of the ends 6, the upper part of said cut-away corners terminating in horizontal shoulders, which rest upon the said eyes and limit the extent of the pins downwardly through the latter. To disengage the hood or receptacle from the mower, it is necessary to raise the front end thereof in a regular manner, and the draft of the mower being in a plane at right angles to the direction of the pins 12 an accidental disengagement of the hood from the mower is prevented. At any time, however, found necessary to disconnect the said hood from the mower, either for emptying the cut grass therefrom or for other purposes, the separation of the parts can be easily attained without releasing nuts and bolts or manipulating complex mechanism.

In emptying the hood or receptacle the opening at the front thereof is clear for this purpose, and while the grass is being thrown backwardly into the hood when the connection of the parts exists the lip 8' also prevents the said cut grass from falling out, and the front opening is large enough to receive all the grass that may be thrown up at different elevations owing to the operation of the cutters or knives.

The improved hood can be attached to and detached from the mower very quickly, leaving the mower free for individual operation. The smooth bottom of the hood or receptacle and the roller at the back do not increase the resistance of the mower and facilitate pressing down all the grass or other growth that is not cut by the knives, giving the lawn a clean, smooth, and velvety appearance.

The hood or receptacle set forth will be constructed of light material and may be increased or decreased in dimensions in accordance with the mower to which it is applied, and other changes in the minor details of construction might be made and substituted for those shown and described without in the least departing from the nature or spirit of the invention.

Having thus described the invention, what is claimed as new is—

The combination with a lawn-mower, of a grass-catcher attachment comprising a receptacle having forwardly-extending sides cut away on their lower corners and provided with rigidly-secured pendent vertical pins removably engaging horizontally-disposed eyes on the mower, the bottom of the receptacle having at its forward edge an upturned forwardly-curved lip conforming to and operating in close proximity with the rear face of the mower-roller, rearwardly-projecting side brackets, and a transverse roller journaled in said brackets, said roller conforming in length to the width of cut of the mower, and carrying the rear end of the receptacle, the forward end thereof being carried by the mower, all substantially as and for the purpose described.

In testimony whereof we affix our signatures in presence of two witnesses.

GEO. BORRETT.
JOSEPH R. CRISPIN.

Witnesses:
   FRANK F. STORY,
   EVERETT F. BUTLER.